Patented Oct. 7, 1941

2,258,578

UNITED STATES PATENT OFFICE 2,258,578

ACID INHIBITOR AND NONCORROSION ACID LIQUOR

Kenneth G. Chesley, Crossett, Ark., assignor to Crossett Chemical Company, Crossett, Ark., a corporation of Delaware No Drawing. Application June 3, 1940, Serial No. 338,626

21 Claim. (Cl. 252—148)

This invention relates to the inhibition of the action of non-oxidizing inorganic acids upon metals. The present application constitutes a continuation-in-part of my copending application Serial No. 202,734 filed April 18, 1938 which has since issued as U. S. Patent No. 2,223,299. The present invention like the parent case is not restricted to pickling and cleaning metal objects but finds utility wherever a non-oxidizing acid is brought in contact with metals such as iron, steel and other metals. The invention comprises the new stabilized inorganic acid liquor, the process of preparing same as well as the new inhibitor per se.

It has been proposed by several investigators to deter the action of acids on metals by the addition of products secured from wood. Pine oil, commercial wood alcohol, waste lyes from sulfite cellulose manufacture and the products of the dry distillation of substances as wood have been found to possess some action. But they are not suitable additions to acid liquors which contact metal such as pickling liquors and oil drilling acid liquors, because their action is not sufficiently pronounced.

I have found that crude acetic acid from pyroligneous acid contains components as impurities therein which react with certain nitrogen compounds to yield products which are excellent corrosion inhibitors in solutions of non-oxidizing acids. Accordingly it is an object of my invention to synthesize a metal corrosion inhibitor for an inorganic acid liquor from crude acetic acid or as pointed out in more detail further on, from fractions thereof, especially that fraction or those fractions containing the impurities in concentrated condition. It is a further object of this invention to prepare an inorganic acid liquor containing a small amount of this inhibitor for various services where this acid liquor would contact metal. It is a further object of this invention also to prepare a metal pickling and cleaning bath containing this inhibitor in small amounts.

In crude acetic acid from pyroligneous acid, the concentration of the impurities therein will vary depending upon the method of refining acetic acid. Furthermore the composition of these bodies will vary somewhat because of this. Among the impurities frequently present in crude acetic acid from pyroligneous products are acids other than acetic, such as propionic and formic acid, aldehydes such as glyoxal and crotonaldehyde, ketones including the di-ketones such as diacetyl and acetonyl acetone, hydroxy- acids, lactones; there are possibly others whose identities are less certain.

The recovery and refining of acetic acid from the crude pyroligneous acid may be accomplished by many different methods which are well known to the art. The pyroligneous acid may be demethanolized, then the acetic acid recovered from the demethanolized liquor by distilling and removing the acetic acid vapors by absorption in a scrubber. Or the demethanolized liquor may be subjected to azeotropic distillation using a withdrawing agent. Or extraction and other means now known to the art may be utilized. Furthermore one of the aforesaid processes may be used before demethanolizing. The process may be continuous or discontinuous. Depending on how the selected process is conducted, it may yield a crude acetic acid which is pure enough for many industrial uses or this acid may need to be refined further before use; or a pure acetic acid may be secured in one operation. In any event at some stage the impurities mentioned supra are associated with the acetic acid. In removing the impurities it is customary to produce various grades of impure acid in which the impurities are concentrated. It has been customary to reprocess this impure acid with the crude pyroligneous acid.

It can readily be seen that the preparation of a compound and/or compounds which are corrosion inhibitors of a high order from this impure acetic acid by causing these non-acetic acid components present therein to react wtih certain nitrogen compounds affords a useful outlet. As pointed out above either the crude acetic acid from pyroligneous acid or the fractions thereof containing the impurities (preferably the more concentrated), are reacted with nitrogen compounds. These include ammonia, ammonium hydroxide, ammonium salts as ammonium carbonate, ammonium acetate, and ammonium oxalate, ammonium derivatives as urea, dicyandiamide, aromatic amines as aniline, alkyl amines as monoamylamine, diamylamine, triamylamine, etc. Some of these compounds react more readily than others. With some the reaction will go to completion at room temperatures. With others it is necessary to reflux at boiling temperatures (160° C. maximum) to complete the reaction. I have also found that in some instances the addition of a small amount of a copper or zinc salt will make the resultant inhibitor more soluble in acid solutions and retard the formation of tar during use.

In one embodiment of this invention the crude acid was obtained by first settling tar from the pyroligneous liquor, then distilling. The crude acid was removed from the pyroligneous vapors by scrubbing with a heavy wood tar oil, then separated from the oil by means of vacuum distillation. This crude acid was rectified and the impurities drawn off in a fraction with most of the higher boiling acids.

This material is referred to as "higher boiling acids." In the trade this is known by such names as "hi-boiling acid," "crude brown acid," "crude propionic acid" and others.

It seems probable that the product formed, when one of the aforesaid nitrogen compounds other than a salt of an aliphatic acid is initially employed, is a salt of aliphatic acid, e. g. ammonium acetate or propionate. This salt of the aliphatic acid then reacts with the "active ingredient" or "active ingredients" present as organic impurities in the crude acids (or fractions, etc. thereof) to form my novel product of this invention. However I do not understand the nature of the reaction involved and do not wish to be bound by the above theoretical explanation. It is sufficient that a reaction does take place which yields a novel product and the presence of $NH_4$, $NH_2$ or other substituted products of nitrogen in the inhibitor is sufficient proof of the reaction.

The nature of my novel invention and the processes of its manufacture and use may be more clearly understood from the following examples.

Example 1

Crude acetic acid obtained from the pyroligneous acid of hardwood distillation as indicated above was employed. 100 milliliters of this crude acid was treated with 3 grams of ammonium acetate and the mixture boiled under reflux for a half hour. The mixture was then distilled until 15 grams remained in the still. This residue was soluble in fairly concentrated hydrochloric acid solutions and was a good inhibitor for preventing metal corrosion in acid baths.

Example 2

100 milliliters of higher boiling acids, likewise secured by the treatment of hardwood, was treated with 5 ml. of ammonium hydroxide (26° Bé.) and the temperature not allowed to exceed 50° C. This mixture was soluble in acid solutions and was an excellent inhibitor in inorganic acid liquors.

Example 3

100 milliliters of higher boiling acids was treated with 2 grams of $CuCl_2 \cdot 2H_2O$ and 20 ml. of ammonium hydroxide. The copper chloride was not soluble in the higher boiling acids, but as the ammonia was added went into solution losing its characteristic copper ammonia ion color and yielding a deep red solution. This mixture was soluble in dilute hydrochloric acid solutions and did not form tar on using at elevated temperatures. It was an excellent inhibitor at various temperature ranges including the higher.

Example 4

An inhibitor was made exactly as in Example 3 except 1 gram of zinc chloride was substituted for 1 gram of copper chloride. The resultant inhibitor possesses the same characteristics.

Example 5

100 milliliters of higher boiling acids was treated with 2 grams of $CuCl_2 \cdot 2H_2O$ and 10 grams of monoamylamine. The mixture was heated to boiling and allowed to cool.

Example 6

100 milliliters of higher boiling acids was treated with 2 grams of dicyandiamide and the mixture boiled under reflux for 15 minutes.

Example 7

100 milliliters of higher boiling acids was treated with 0.5 gram urea and 3 grams of ammonium hydroxide and the mixture boiled under reflux for 1 hour.

Example 8

An excess of sodium carbonate was added to the higher boiling acids and the impurities distilled therefrom. 10 ml. of the distilled impurities from the higher boiling acids was treated with 0.2 gram $CuCl_2 \cdot 2H_2O$ and 2 ml. of ammonium hydroxide.

The efficiency of the inhibitor secured by each of the aforesaid mentioned procedures was tested as follows: Strips of mild steel 1" x 2¾" x ⅛" were cleaned by sandblasting and weighed. These were immersed in 150 ml. of acid for the required time and reweighed. Some representative tests are given in the following table.

| Acid | Temperature °F. | Time of contact Hours | Metal loss Grams | Efficiency Percent |
|---|---|---|---|---|
| 15% hydrochloric acid | 150 | 1 | 1.9453 | 0 |
| 15% hydrochloric acid + 0.5% inhibitor | 150 | 16 | 0.8401 | 97.30 |
| 15% hydrochloric acid + 1.0% inhibitor | 150 | 16 | 0.6158 | 98.02 |
| 15% hydrochloric acid + 1.5% inhibitor | 150 | 16 | 0.5594 | 98.20 |
| 18° Bé. hydrochloric acid | 77 | 5.58 | 2.5025 | 0 |
| 18° Bé. hydrochloric acid | 77 | 13.17 | 0.0994 | 99.14 |

In manufacturing this corrosion inhibitor using these various nitrogen compounds as reactants, it is not necessary or even desirable to take the inhibitor up in hydrochloric acid. It need not be introduced into the acid which is to be stabilized until this acid is to be used.

From the examples it is evident that a wide variety of concentration of the reactants, selection of basic nitrogen compounds as well as fractions of crude acetic acid from pyroligneous acid is possible in the operation to produce my novel inhibitors without departing from the scope of my invention. The ultimate temperature attained may also vary over quite a range. In fact it is very expedient to vary the proportions of reactants depending upon the concentration of these active impurities present in the crude acetic acid and/or fractions from it. The essential thing is the presence of the components found in crude acetic acid from pyroligneous acid which are known not to be acetic acid itself. Furthermore the composition of the crude acid, higher boiling acid and other concentrates of the impurities found in pyroligneous acid will not only vary from different sources and methods of refining but will vary from time to time. Pyroligneous products from any plant material containing cellulose, lignin and related compounds, with the exception of softwood distillation products are suitable parent materials. Nut shells and other cellulose type farm wastes are suitable sources.

It is to be understood that I do not limit myself to the foregoing examples or description except as indicated in the following patent claims.

I claim:

1. In the process of producing an inhibitor against acid corrosion, the step comprising reacting higher boiling acids from pyroligneous acid with ammonium hydroxide while preventing the temperature from exceeding 50° C.

2. In the process of producing an inhibitor against metal corrosion, the steps of reacting higher boiling acids from pyroligneous acid with monoamylamine at a temperature below the thermal decomposition point of the resulting inhibitor produced.

3. The process set out in claim 1 wherein the reaction takes place in the presence of a salt of the groups consisting of Cu and Zn which makes the inhibitor more soluble in inorganic acids.

4. In the process of producing an inhibitor, the step of reacting higher boiling acids from pyroligneous acid with urea at a temperature below the thermal decomposition point of the resulting inhibitor produced.

5. In the process of producing an inhibitor, the step of reacting higher boiling boiling acids from pyroligneous acid with dicyanamide at a temperature below the thermal decomposition point of the resulting inhibitor produced.

6. In the process of producing an inhibitor against acid corrosion, the steps of reacting crude acetic acid from pyroligneous acid with a non-volatile basic inorganic salt which will react with acetic acid to form a non-volatile product, distilling off the impurities from the acids and reacting the impurities with a basic nitrogen compound at a temperature below the thermal decomposition point of the inhibitor produced.

7. The process set out in claim 6 wherein the basic nitrogen compound is ammonium hydroxide.

8. In the process for the manufacture of organic nitrogen derivatives of the higher boiling acids fraction produced from the distillation of hardwood, the step comprising: reacting the higher boiling acids fraction without the application of heat with a substance which has available NH3 and in whose structural formula none of the H atoms of the NH3 are replaced.

9. As a new composition of matter the products formed by the reaction of claim 8.

10. In the process for the manufacture of organic nitrogen derivatives of the crude acids containing acetic and higher aliphatic acids produced from the distillation of hardwood, the step comprising: reacting the crude acids without heating with a substance which has available NH3, and in whose structural formula none of the H atoms of the NH3 are replaced.

11. A non-oxidizing mineral acid solution tending to corrode metal containing therein a relatively small amount of a metal corrosion inhibitor comprising the product secured by the reaction without the application of heat of the crude acids containing acetic and higher aliphatic acids, produced from hardwood distillation, with a substance having available NH3, and in whose structural formula none of the H atoms of the NH3 are replaced.

12. A cleaning and pickling bath for metals comprising a solution of a non-oxidizing mineral acid and a relatively small amount of a metal corrosion inhibitor comprising the product secured by the reaction without the application of heat of the crude acids containing acetic and higher aliphatic acids, produced from hardwood distillation, with a substance having available NH3, and in whose structural formula none of the H atoms of the NH3 are replaced.

13. In the process of producing an inhibitor against acid corrosion the steps of concentrating the organic impurities found in crude acetic acid of pyroligneous acid derivation to form a liquid fraction, said impurities being non-carboxylic acids, and then reacting these impurities with a member of the group consisting of basic nitrogen compounds and ammonium salts of water soluble weak acids.

14. An inorganic non-oxidizing acid liquor tending to corrode metal containing therein a small amount of a corrosion inhibitor which is a reaction product of a liquid fraction of crude acetic acid from pyroligneous acid containing the organic impurities, said impurities being compounds other than the acetic acid, with a member of the group consisting of basic nitrogen compounds and ammonium salts of water soluble weak acids.

15. A pickling or cleaning bath for metals which comprises hydrochloric acid having therein a small amount of a corrosion inhibitor which is a reaction product of a liquid fraction of crude acetic acid from pyroligneous acid containing the organic impurities, said impurities being compounds other than the acetic acid, with a member of the group consisting of basic nitrogen compounds and ammonium salts of water soluble weak acids.

16. An inorganic non-oxidizing acid liquor tending to corrode metal containing therein a small amount of a metal corrosion inhibitor which is a product secured by reacting the crude acetic acid containing acetic acid and higher aliphatic acids from pyroligneous acid with a member of the group consisting of basic nitrogen compounds and ammonium salts of water soluble weak acids.

17. A pickling or cleaning bath for metals which comprises hydrochloric acid having therein a small amount of a metal corrosion inhibitor which is a product secured by reacting the crude acetic acid containing acetic and higher aliphatic acids from pyroligneous acid with a member of the group consisting of basic nitrogen compounds and ammonium salts of water soluble weak acids.

18. An inorganic non-oxidizing acid liquor tending to corrode metal containing therein a small amount of a corrosion inhibitor which is a reaction product of a liquid fraction of crude acetic acid from pyroligneous acid containing the organic impurities, said impurities being compounds other than the acetic acid, with ammonium hydroxide at a temperature not exceeding 50° C.

19. A pickling or cleaning bath for metals which comprises hydrochloric acid having therein a small amount of a corrosion inhibitor which is a reaction product of a liquid fraction of crude acetic acid from pyroligneous acid containing the organic impurities, said impurities being compounds other than the acetic acid, with ammonium hydroxide at a temperature not exceeding 50° C.

20. An inorganic non-oxidizing acid liquor tending to corrode metal containing therein a small amount of a corrosion inhibitor which is a reaction product of a liquid fraction of crude acetic acid from pyroligneous acid containing the organic impurities, said impurities being compounds other than the acetic acid, with organic amines.

21. A pickling or cleaning bath for metals which comprises hydrochloric acid having therein a small amount of a corrosion inhibitor which is a reaction product of a liquid fraction of crude acetic acid from pyroligneous acid containing the organic impurities, said impurities being compounds other than the acetic acid, with organic amines.

KENNETH G. CHESLEY.